(12) United States Patent
Ruutu et al.

(10) Patent No.: US 7,032,111 B1
(45) Date of Patent: Apr. 18, 2006

(54) METHOD FOR OPTIMIZING OF DATA TRANSMISSION

(75) Inventors: Jussi Ruutu, Espoo (FI); Jian Ma, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/456,263

(22) Filed: Dec. 7, 1999

(30) Foreign Application Priority Data

Dec. 8, 1998 (FI) ..................................... 982651

(51) Int. Cl.
*H04L 9/00* (2006.01)
*H04K 1/00* (2006.01)

(52) U.S. Cl. .................. 713/160; 713/161; 713/162; 713/163; 380/29; 380/30

(58) Field of Classification Search ................ 713/160, 713/161, 162, 163; 380/29, 30
See application file for complete search history.

(56) References Cited

U.S. PATENT DOCUMENTS

| | | | | |
|---|---|---|---|---|
| 5,070,528 A | | 12/1991 | Hawe et al. .................. 380/48 |
| 5,583,940 A | * | 12/1996 | Vidrascu et al. ............ 713/151 |
| 5,757,924 A | | 5/1998 | Friedman et al. ............. 380/49 |
| 6,160,793 A | * | 12/2000 | Ghani et al. ................ 370/236 |
| 6,240,514 B1 | * | 5/2001 | Inoue et al. ................ 713/153 |

OTHER PUBLICATIONS

Information Science Institute USC, "RFC 791—Internet Protocol", Sep. 1981, pp. 1-37.*
Network Working Group, "RFC 1883—Internet Protocol, Version 6 (IPv6) Specification", Dec. 1995, pp. 1-27.*
"A Simple Fast Flow Control For TCP/IP Over Satellite ATM Network", Jian Ma, ATM 98 Conference.
"An Acknowledgement Bucket Scheme For Regulating TCP Flow Over ATM" Narvaez et al., Globecom 97.
"Explicit Rate Control Of TCP Applications", Satyavolu et al., ATM Forum Document 98-0152.
"TCP Flow Control With ACR Information", ATM Forum Document ATMF97-758rl, 1997.
"ACK Spacing For High Delay-Bandwidth Paths With Insufficient Buffering", C. Partridge, Internet Draft, 1999.

* cited by examiner

*Primary Examiner*—Matthew Smithers
*Assistant Examiner*—Courtney D. Fields
(74) *Attorney, Agent, or Firm*—Perman & Green, LLP

(57) ABSTRACT

The invention is related to optimization of data transmission in TCP/IP networks, particularly to problems created by transmission of encrypted traffic. According to the invention, an indication of a TCP ACK being carried in the encrypted payload of a IP datagram is added in the IP header of the datagram. The indication may simply be a flag indicating the presence of a TCP acknowledgment. The indication may also contain the acknowledgment number, which allows processing of the encrypted traffic based on the acknowledgment number. In IPv4 datagrams, the indication may be inserted as an extra option field. In IPv6 datagrams, the indication may be inserted as an extension header.

12 Claims, 5 Drawing Sheets

| Version | IHL | Type of service | Total length | | |
|---|---|---|---|---|---|
| Identification | | | Flags | Fragment offset | |
| Time to live | | Protocol | Header checksum | | |
| Source address | | | | | |
| Destination address | | | | | |
| Options | | | | | Padding |

Fig. 1
PRIOR ART

| Source port | | | | Destination port | |
|---|---|---|---|---|---|
| Sequence number | | | | | |
| Acknowledgment number | | | | | |
| Data offset | Reserved | U R G A C K P S H R S T S Y N F I N | | Window | |
| Checksum | | | | Urgent pointer | |
| Options | | | | | Padding |

Fig. 3
PRIOR ART

METHOD FOR OPTIMIZING OF DATA TRANSMISSION

TECHNICAL FIELD OF THE INVENTION

The invention is related to optimization of data transmission in TCP/IP networks, particularly to problems created by transmission of encrypted traffic.

BACKGROUND OF THE INVENTION

TCP/IP network technology is presently in widespread use, the Internet being a manifest example of a network realized using the Transmission Control Protocol (TCP) and Internet Protocol (IP). The IP protocol provides a basic packet data transfer mechanism without error checking, acknowledgments or flow control. The TCP protocol provides a reliable data transmission mechanism with transmission error correction, flow control and many other functions. The IP protocol is defined in the specification RFC 791, and the TCP protocol is defined in the specification RFC 793. An introduction to these protocols is presented in RFC 1180.

The IP protocol version 4 (IPv4) defined by RFC 791 has a limited address space due to the source and destination addresses being only 32 bit long. The current expansion of the Internet and the development of technology, the address space is filling out quickly. Therefore, version 6 of the IP protocol (IPv6) has been designed. The addresses in IPv6 are 128 bits long, allowing a vastly larger address space. There are also further motivations behind IPv6 and other differences between IPv4 and IPv6. The IPv6 protocol is described in the specification RFC 1883. Some details of the TCP and IP protocols relevant to the present invention are described in the following with reference to FIGS. 1, 2, and 3.

In the IP protocol, data is transmitted in so called datagrams, which contain a header part and a payload data part. FIG. 1 shows the structure of an IPv4 header. In the following only some of the header fields are described. A detailed description can be found from the above mentioned RFC 791. The first field, the four bits long version field, contains the version number which for IPv4 is 4. The total length field gives the length of the datagram, header and data part combined, as the number of octets i.e. groups of 8 bits. The source and destination addresses specify the IP address of the sender and the intended receiver. Various options can be specified in the options field, which may vary in length from datagram to datagram. The number of different options specified in the options field may as well vary. The options field is not mandatory, i.e. in some datagrams there may be no options field at all. The padding field is used to ensure that the header ends on a 32 bit boundary. The padding field is filled with zeroes. After the padding field comes the payload data part, whose length can be found out by the recipient of the datagram by subtracting the length of the header from the value of the total length field.

FIG. 2 illustrates the structure of an IPv6 header. The IPv6 header is simpler than the IPv4 header, allowing faster processing of datagrams in transmission nodes. The first four bits of the header comprise the version field, which for IPv6 contains the value 6. The payload length field specifies the length of the data part in octets. The next header field specifies the type of any header following this header. The next header may for example be a TCP header in case the IP datagram carries a TCP packet, or an extension header. The source and destination address fields, each consisting of four 32-bit words giving a total of 128 bits for each address, specify the sender and the intended receiver of the datagram. Instead of an options field, inclusion of optional data in the header is provided in IPv6 by so called extension headers. Various extension header types are described in RFC 1883. There may be zero, one or more than one extension headers in an IPv6 datagram. Each IPv6 datagram comprises extension headers for only those facilities that the datagram uses. The extension headers are placed after one another after the main header in a chain-like fashion. Each extension header comprises a Next header field. The next header field of the main header specifies the type of the first extension header, and the next header field of each extension header specifies the type of the following extension header. A special value in the next header field specifies that no more headers follow this specific header.

FIG. 3 illustrates the structure of a TCP header. The most relevant fields are described in the following. The other fields in a TCP header are described in the above mentioned RFC 793.

The TCP header indicates a destination port number at the receiving host, to which the packet is directed. The TCP protocol makes it possible for many different services to exist at a single IP address, by introducing the concept of a port. A program can listen to a specific port, and receive any data sent to that port. Conversely, a program can send a packet to a specific port on a distant host. Therefore, the destination port number defines which service or program will receive the packet at the host specified by the IP address. Similarly, the source port number indicates, which service or program sent the TCP packet.

The TCP data octets sent by a host are numbered sequentially. The number of the first octet of data in the data part is included in the TCP header in the sequence number field. Based on this number, the receiving second host can check whether TCP packets have arrived through the transmission network in the right order, and if any packets are missing. The second host conventionally sends an acknowledgment to the first host for each received packet. The acknowledgment message is included in a normal TCP packet sent by the second host to the first host. The acknowledgment is indicated by the ACK flag and the acknowledgment number. The acknowledgment number is the sequence number of the next octet, which the sender of the packet is expecting to receive from the other end. If there is no other data to be sent from the second host to the first host, the payload data part can be empty in such an acknowledgment packet. If the second host is transmitting data to the first host, the acknowledgment can be indicated in the header of a packet containing some payload data. Therefore, the ACK messages do not always add transmission load. If a host does not receive an acknowledgment for some data within a timeout period, the data is retransmitted.

The data part follows the TCP header. The length of the data part is carried by the IP protocol, therefore there is no corresponding field in the TCP header.

TCP is one of the few transport protocols that has its congestion control mechanisms. The key congestion control mechanism in TCP is the "slow start" mechanism, which functions in the following way. According to the TCP protocol, the sender starts sending data at a very slow rate, and monitors acknowledgment ACK messages from the receiving end to see, if any data is lost. If no data is lost i.e. sender always receives an ACK, the TCP sending host increases the data rate. The sending increases the data rate, until data is lost, which the sender can observe as missing ACK messages. The data loss typically results from the behavior of intermediate hosts: if an intermediate node cannot forward a data packet due to congestion, the node simply discards the packet. The sending host then retransmits the packet at a later time, since no ACK message was received from the receiving host due to disappearance of the packet. When the sending host notices that ACK messages have not been received for a data packet, the sending host decreases the data rate, until no more data is lost. When each transmitted packet again results in an ACK message, the sending host starts increasing the data rate again. Consequently, an oscillating behavior results, in which the TCP transmission oscillates with a period of 1 to 2 seconds, and data is lost on one part of the cycle and the capacity of the network is not used in an optimum way on the other part of the cycle.

Recently, a new mechanism for controlling congestion situations in a TCP/IP network has been presented, for example, in an article entitled "A Simple Fast Flow Control for TCP/IP over Satellite ATM Network" by Jian Ma, published in the proceedings of the wmATM '98 conference, 6–10 Apr. 1998, Hangzhou. This mechanism, called Fast TCP or FTCP, alleviates the problems of oscillation. In this mechanism, when an intermediate node detects a congestion situation, it delays the ACK messages returning from the receiving end. As a result of ACK messages being delayed, the sending host delays the sending of further data packets, which reduces congestion. In this way, congestion can be controlled without loss of data.

Fast TCP is only one example of various control mechanisms which rely on identification of the contents of IP packets, i.e. identification of TCP messages. Another example of such a mechanism is a method described by R. Satyavolu et al in ATM Forum Document 98-0152 "Explicit rate control of TCP applications", which utilizes the window value carried in the TCP header for rate control of TCP traffic. The main idea of this method is to modify the contents of the window size field in the TCP header. This method does not work if a network element is not able to access the encrypted IP payload, identify the original window size, read it and communicate the modified value to the TCP source with the IP datagram. Other examples concerning control of TCP traffic have also been proposed by MIT and End-to-End Research Group of the Internet Research Task Force respectively in "An Acknowledgment Bucket Scheme for Regulating TCP Flow over ATM", in Globecom '97, November 1997, and "ACK spacing for high delay-bandwith paths with insufficient buffering", Internet Draft, July 1997. The ATM Forum document ATMF97-758r1 entitled "TCP flow control with ACR information", December 1997, describes an example of using TCP ACKs as a flow control interworking media.

Encryption of IP traffic is often desirable for security reasons. In encrypted IP traffic, all payload data of the IP datagrams is encrypted. Since the TCP header and data are carried as payload data in IP datagrams, all TCP header information is encrypted as well along with TCP data.

However, IP encryption creates a problem, when any mechanisms relying of identification of TCP messages are used. Any mechanisms which rely on the recognition and possible processing of TCP ACK messages require that at least some of the intermediate nodes participating in the mechanisms are able to read the contents of the IP packets. If the IP traffic is encrypted, the intermediate nodes cannot identify the TCP messages. Therefore, the intermediate nodes are unable to perform the control mechanisms based on TCP ACK messages.

SUMMARY OF THE INVENTION

An object of the invention is to realize a method for transmission of encrypted IP traffic, which allows control of the data transmission based on information carried in headers of TCP packets. A further object of the invention is to realize a method for transmission of encrypted IP traffic, which allows control and/or processing of TCP ACK messages.

The objects are reached by inserting at least an indication of the presence of the information on which the control is based into the header of the IP datagram carrying the TCP packet. The insertion of said at least an indication may comprise placing of at least a copy of the information on which the control is based into the header of the IP datagram.

The method according to the invention is characterized by that, which is specified in the characterizing part of the independent method claim. The dependent claims describe further advantageous embodiments of the invention.

According to the invention, at least an indication of a TCP ACK or other TCP information used as a basis of processing is placed in the IP header of an IP datagram, if such information is carried by the IP datagram. The indication may simply be a flag indicating the presence of a TCP acknowledgment. The indication may also contain the acknowledgment number or other TCP header information, which allows processing of the encrypted traffic based on the acknowledgment number or other TCP header information. In IPv4 datagrams, the indication may be inserted as an extra option field. In IPv6 datagrams, the indication may be inserted as an extension header.

BRIEF DESCRIPTION OF THE DRAWINGS

The invention is described in more detail in the following with reference to the accompanying drawings, of which
FIG. 1 illustrates the structure of an IPv4 header,
FIG. 3 illustrates the structure of a TCP header.

Same reference numerals are used for similar entities in the figures.

DETAILED DESCRIPTION

In the following, four groups of embodiments of the invention are described in further detail.

First Group of Embodiments

In the first group of embodiments, the source originating the TCP traffic being acknowledged performs the decryption of the TCP traffic. In order to allow an intermediate network element to perform ACK based processing, information about ACK messages contained in the received packets are signalled to any such intermediate network elements performing ACK based processing. Encrypted IP packets are decrypted at the TCP source host, and before conventional TCP processing, the ACK information is routed to the entity performing the ACK-based control or processing. There may be one or more such entities. When there are more than one such entities, the ACK information is sent to all of these entities. The entity may be an intermediate network element, or a control member within the TCP source host.

Figure 2:
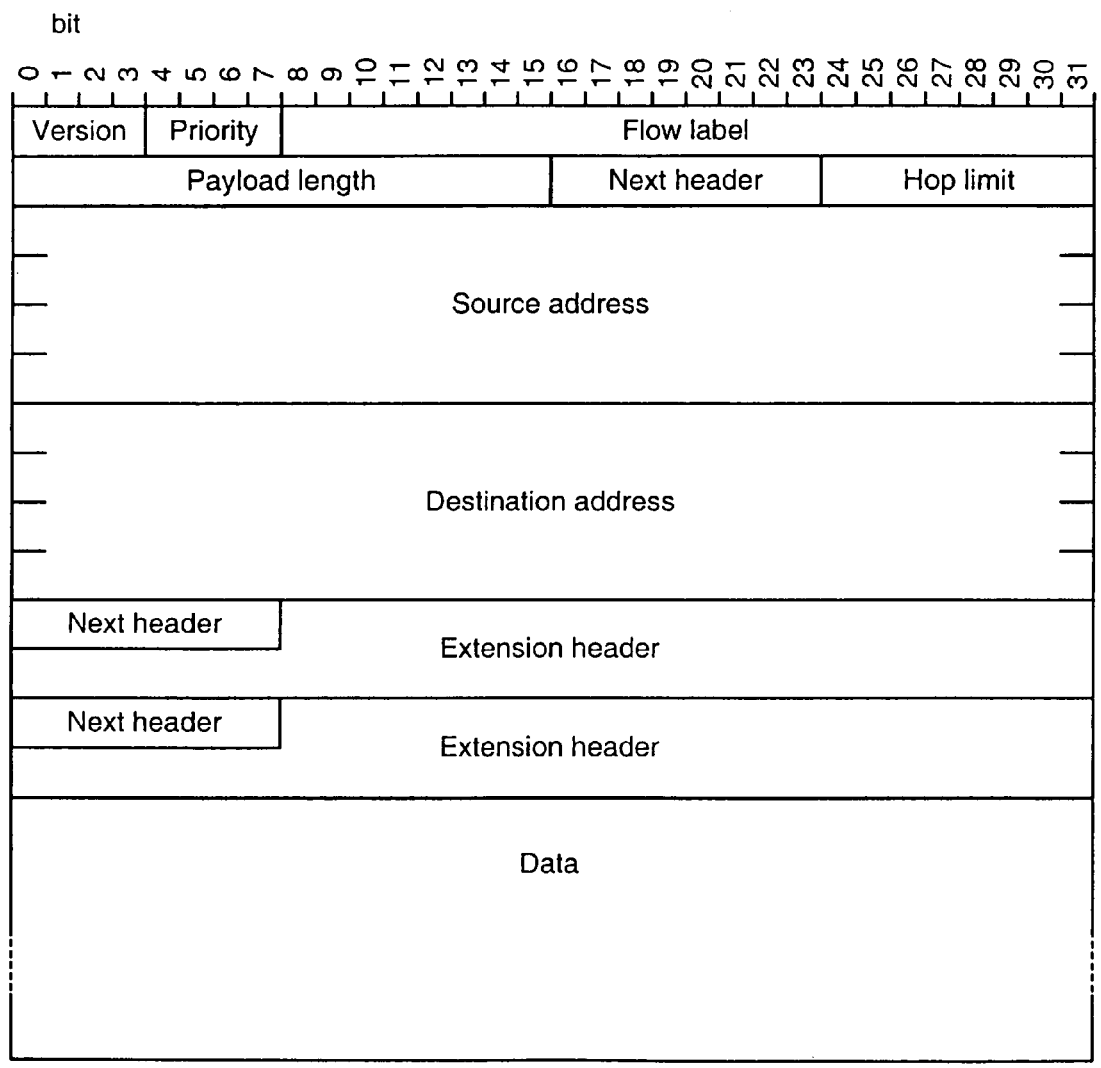
FIG. 2 illustrates the structure of an IPv6 header.
Figure 4:
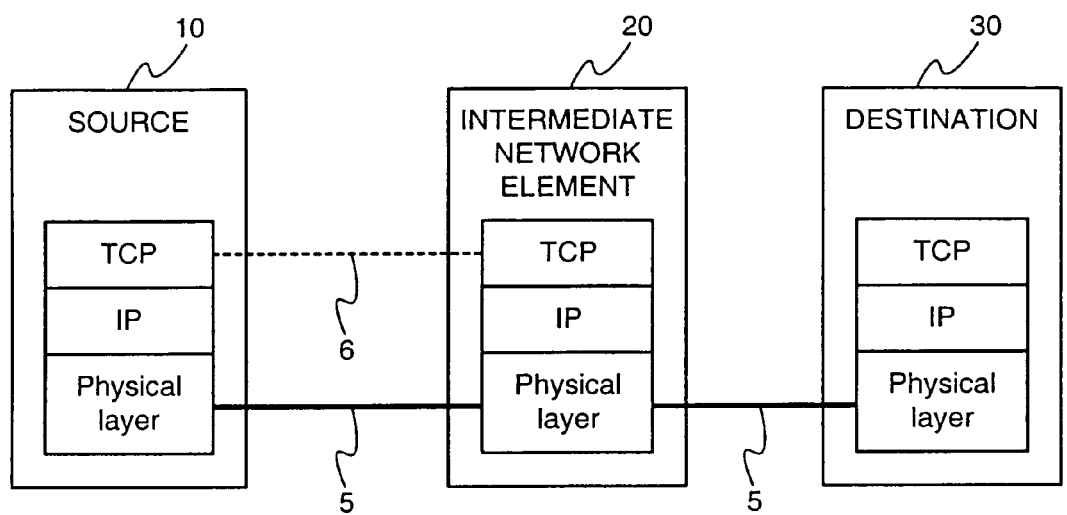
FIG. 4 illustrates one advantageous embodiment of the invention.

FIG. 4 illustrates the configuration in an advantageous embodiment of the invention, which embodiment is an example of the first group of embodiments. FIG. 4 illustrates a source network element 10, an intermediate network element 20 and a destination network element 30 as well as communication links 5 between the elements. FIG. 4 further illustrates the protocol stacks at each element, in which stack the physical layer is lowest, IP layer above the physical layer and the TCP layer above the IP layer. According to this embodiment, a further communication channel 6 is set up between the source network element 10 and the intermediate network element 20, which communication channel is used to transmit information about ACK messages contained in the received packets. This configuration allows the intermediate network element to process the traffic, even though the IP traffic is encrypted.

In one advantageous embodiment of the invention, the ACK messages are stored in a queue at the source host, and information about the messages is signalled to a ACK processing network element. The source host waits for commands from the network element before further processing of the queued ACK messages.

In another advantageous embodiment of the invention, any ACK message information found in decrypted packets is signalled to a network element and subsequently discarded by the source host. In this embodiment, the network element inserts the ACK messages in the traffic for example unencrypted. When the source host receives unencrypted ACK messages, the source host performs normal ACK processing. In this embodiment, the source host may comprise an acknowledgment message routing unit, which routes the ACK messages found in encrypted packets to any intermediate network elements performing ACK based processing, and allows ACK messages found in unencrypted packets to be processed in the normal way by the source host.

In a further advantageous embodiment of the invention, the ACK-based processing is performed in the source host, which decrypts the encrypted IP traffic. In this embodiment, a network element performing ACK processing for unencrypted traffic, signals any further information needed for the ACK processing to the source host in case of encrypted traffic, whereby the source host is able to perform similar processing. Said further information may comprise for example information about the congestion situation of the network as observed by the network element.

Second Group of Embodiments

The problems associated with ACK processing of encrypted IP traffic can also be solved by providing network elements performing the processing with the capability to decrypt IP packets. In such an embodiment, the network element is able to decrypt the IP packets and perform the network control functions, such as FTCP processing, in the normal way. Such an embodiment has for example such an advantage that no changes are needed in the programs performing TCP and IP processing and IP encryption and decryption at either source or destination host. The actual realization of such an embodiment is naturally dependent on the encryption system used for encryption of the IP datagrams. For example, the entity performing the encryption may transmit to the network element the decryption key needed for the decryption of the IP datagrams. As an another example, the network element may be provided with decryption keys for a number of TCP connections, which connections are processed by the network element.

Third Group of Embodiments

The problems associated with ACK processing of encrypted IP traffic can also be solved by using plain, i.e. unencrypted ACK messages. In such an embodiment, the entity performing the encryption of IP datagram payload data leaves such datagrams unencrypted, which datagrams contain a TCP ACK message. Other datagrams are encrypted in the normal way. This method allows processing of ACK messages by intermediate network elements to proceed in the normal way, since the ACK messages are not encrypted.

In this embodiment, the TCP destination host is required to produce both encrypted and plain IP packets belonging to the same TCP connection, and the TCP source host is required to be able to receive both encrypted and plain IP packets.

Preferably, in this embodiment, TCP ACK messages are sent in otherwise empty TCP packets, i.e. no data is sent in those packets containing an ACK message, in order to avoid sending payload data unencrypted.

This embodiment has such an advantage, that it does not require additional signalling channels, and that more than one network elements can observe the ACK messages without special arrangements. Therefore, this embodiment allows easy changes in the network topology, such as increasing the number of intermediate network elements.

Fourth Group of Embodiments

According to a further embodiment of the invention, an indication that a TCP ACK message is contained in an encrypted IP datagram is placed in the header of the IP datagram. This allows the intermediate network elements to perform processing based on the ACK messages despite the fact that the ACK messages themselves are encrypted. An indication of an ACK message without the ACK number is sufficient to such processing, which does not need the ACK number. In another embodiment of the invention, also the ACK number is placed in the IP header. This allows functioning of such mechanisms, which need the ACK number in some way. For example, such mechanisms may then modify the ACK number.

With IPv4 datagrams, the indication of an ACK message may be incorporated in the IP header as an extra option field. The ACK number may as well be incorporated in the IP header as an extra option field. The indication of an ACK message and the ACK number may be contained in the same option field, or they may be placed in separate option fields. The invention does not limit the encoding of the indication of an ACK message nor the encoding of the ACK number in the extra option field or fields in any way. A person skilled in the art can devise many different ways of encoding the indication of ACK and the ACK number in an extra option field of an IPv4 header.

The ACK message or an indication of an ACK message can be encoded in many ways in an IPv4 header. For example, an indication of an ACK message can be included in the Type of Service (TOS) field. The bits 6 and 7 of the TOS field are unused according to current IPv4 specifications, whereby one of these two bits could for example be used to indicate an ACK message. For example, in one embodiment of the invention, bit 6 of the TOS field of an IP datagram is set to 1, if the IP datagram comprises a TCP ACK message and to 0, if the IP datagram does not comprise a TCP ACK message.

Figure 5:
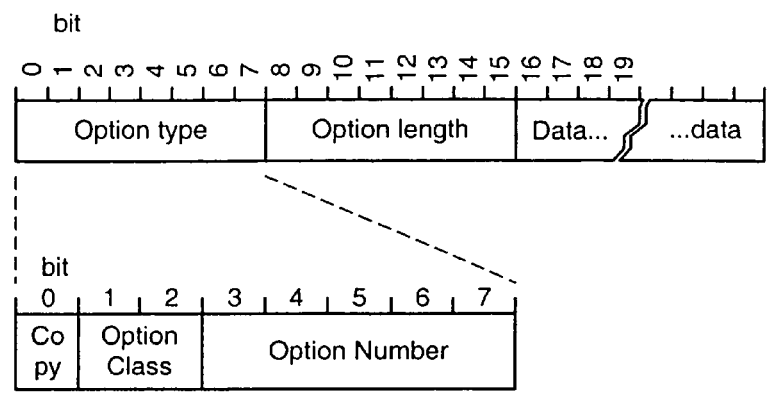
FIG. 5 illustrates the structure of the option code octet of an option field in an IPv4 header.

In another advantageous embodiment of the invention, the encoding of an ACK message is realized by copying at least a part of the TCP header into an option field of an IPv4 datagram. FIG. 5 illustrates the structure of an option field. An option field contains either an option type octet only, or an option type octet, an option length octet and data. The first bit of the option type octet i.e. bit number 0 indicates, whether the option field should be copied only to the first fragment of an IP datagram in such a case, when the IP datagram is fragmented at some point during its transmission. If the first bit is set to 0, only the first fragment shall contain the option field. If the first bit is set to 1, the option field is copied to all fragments. Bits 1 and 2, i.e. Option Class bits describe the class of the option. In this example of an embodiment, these bits can be set to 0, in which case the option class bits indicate that the option class is "control", i.e. contents of the field are associated with datagram or network control. The remaining bits of the Option Code octet, i.e. the Option Number field indicates the use of the option field. For this embodiment of the invention, one of the currently unused option numbers should be defined to indicate, that the option field contains at least a part of the TCP header carried in the IP datagram. For example, option number 15 could be defined to indicate this. The meaning of the various values of the Option Class bits and the Option Number bits are defined in the previously mentioned specification RFC 791. The option length octet indicates the length of the whole option field in octets. The data part of the option field contains the actual data of the option field. Preferably, in this embodiment the data part comprises at least the TCP acknowledgement number. The data part may also comprise a whole TCP header.

In an advantageous embodiment of the invention, the existence of an option field containing a TCP header is used as an indication of a TCP ACK or other TCP information.

In an advantageous embodiment of the invention, an indication of an ACK message may be incorporated in an IPv6 datagram as an extension header. The ACK number may as well be incorporated as an extension header, and the indication and the ACK number may be incorporated in the same extension header or as separate extension headers. According to this embodiment of the invention, a new extension header type needs to be defined, i.e. a type specifying that the extension header contains at least a part of a TCP header. In the following, such an extension header is called the TCP extension header.

The TCP extension header can be inserted for example before the Authentication and Encapsulation security payload (ESP) extension headers in an IPv6 datagram.

Figure 6:
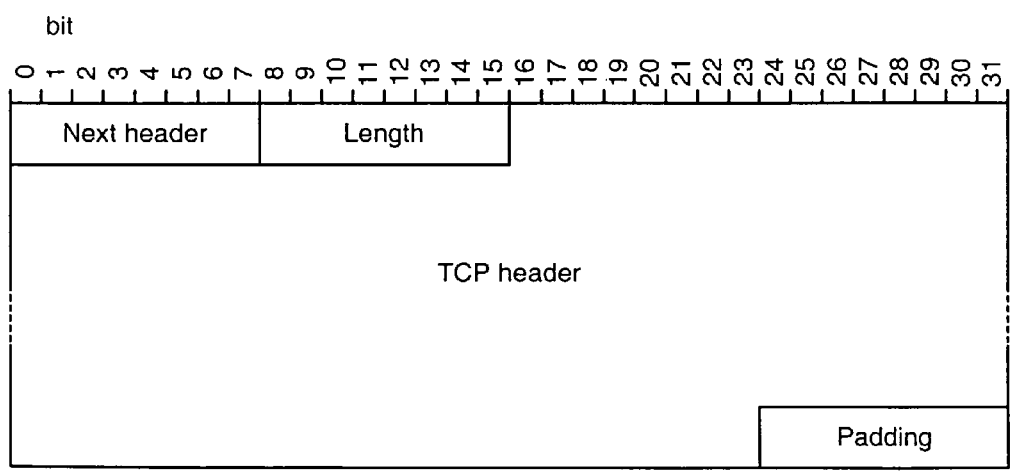
FIG. 6 illustrates the structure of an IPv6 extension header according to an embodiment of the invention.

FIG. 6 illustrates an example of the structure of a TCP extension header according to an advantageous embodiment of the invention. In this embodiment, the TCP extension header contains a Next header field specifying the type of the next header, a Length field specifying the length of the extension header in 8-octet units, the TCP header or at least a part of it, and possibly padding to fill up any remaining space until the length of the extension header is a multiple of 8-octet units as required by RFC 1883. The padding may be realized for example in the way described in section 4.2 of RFC 1883, i.e. by using a single octet of zeroes when only one octet of padding is needed, and by using a single octet of ones, an octet specifying padding length minus two, and N−2 octets of zeroes, when N octets of padding are needed.

Preferably, the entity which performs the encryption of IP datagrams performs the incorporation of the indication of an ACK message in the IP header. The entity performing the incorporation is preferably the TCP destination host, which creates the ACK messages.

However, the invention is not limited to incorporation of an indication of an ACK message in the TCP destination host. For example, the TCP destination host encrypting the IP datagrams may communicate information to a further processing entity, the information indicating which IP datagrams contain an ACK message, and the associated ACK numbers. The further processing entity may then add an indication of an ACK message and possibly also the ACK number to those encrypted IP datagrams, which are pointed out by the TCP destination host as containing an ACK message. Therefore, the process of incorporation of an indication of an ACK message does not need to be performed by the same entity performing the IP encryption.

Incorporation of an indication of an ACK message into the IP header has for example such an advantage, that the TCP source host programs performing the IP decryption and TCP processing do not necessarily need to be changed. The source host can simply ignore the indication of the ACK message. In such embodiments of the invention, where the ACK number is also incorporated in the IP header and various processing mechanisms in the intermediate nodes may modify the ACK number, conventional TCP source host programs do need to be modified to the degree, that the programs use the modified ACK number from the IP header and not the unchanged ACK number from the decrypted TCP packet.

Incorporation of an indication of an ACK message into the IP header has for example also such an advantage, that no TCP payload data needs to be sent without encryption, even if a TCP packet contains both an ACK message and payload data.

Figure 7:
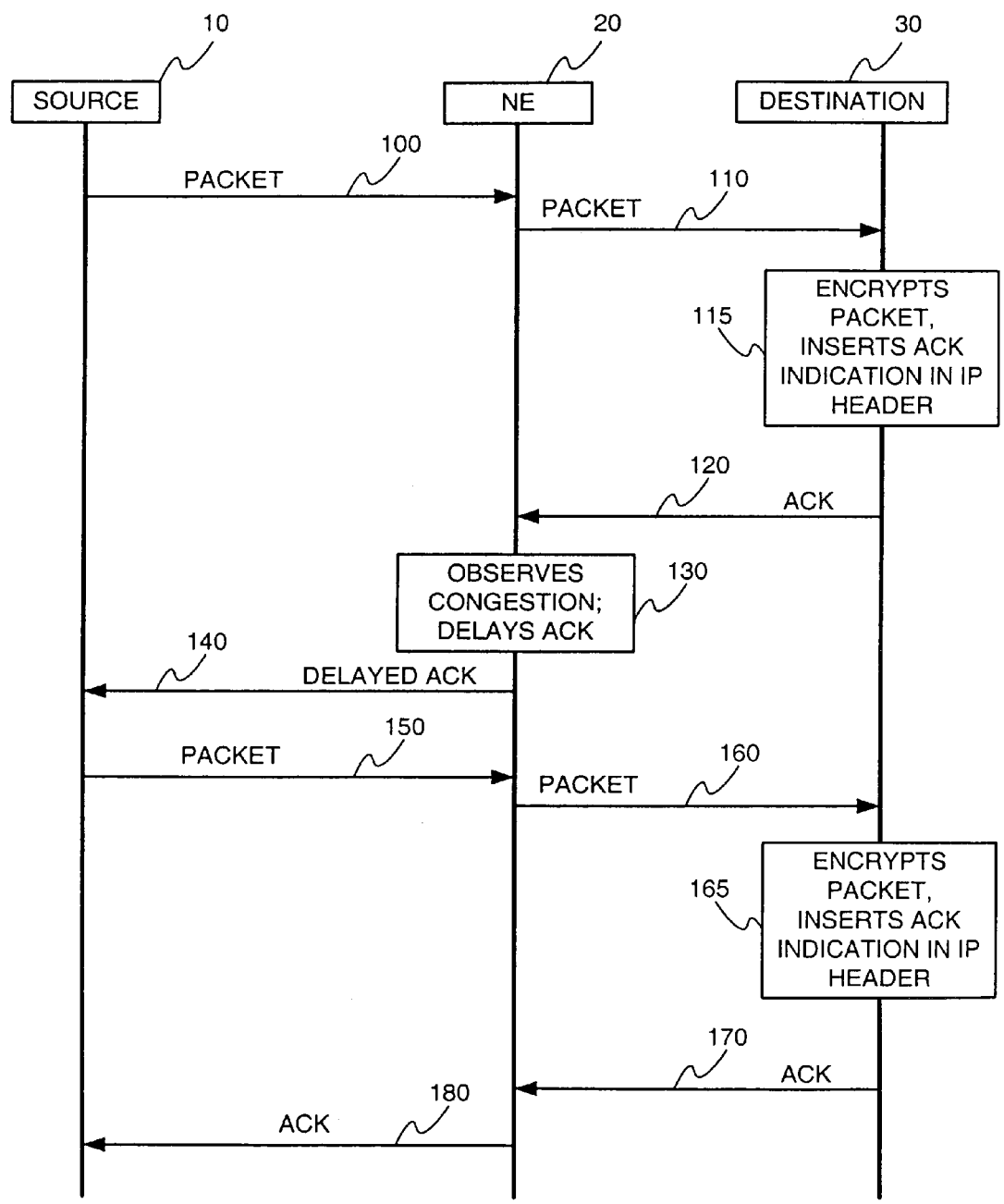
FIG. 7 illustrates signalling according to an advantageous embodiment of the invention.

FIG. 7 shows one example of signalling according to one embodiment belonging to the fourth group of embodiments. FIG. 7 shows signalling between a source host 10, a network element 20 and a destination host 30. First, the source host 10 sends 100 a packet to the network element 20, which forwards 110 the packet to the destination host 30. The destination host then encrypts a datagram for transmission back to the source host. In this case, the TCP packet in the datagram contains an acknowledgment, wherefore the destination host inserts 115 an indication of the ACK message in the header of the encrypted IP packet. After preparation of the packet with the acknowledgment, the destination host sends 120 the packet to the network element 20. The network element observes from the IP header that the packet contains an ACK message. In this example, the network is congested at this time, wherefore the network element delays 130 the datagram containing the ACK. When the congestion has eased enough, the network element forwards 140 the datagram to the source host. FIG. 7 shows also a further example of signalling in case of no congestion. The source host 10 sends 150 a packet to the network element 20, which forwards 160 the packet to the destination host 30. The destination host then encrypts a datagram for transmission back to the source host. In this case, the TCP packet in the datagram contains an acknowledgment, wherefore the destination host inserts 165 an indication of the ACK message in the header of the encrypted IP packet. After preparation of the packet with the acknowledgment, the destination host sends 170 the packet to the network element 20. In this case, the network is not congested, whereby the network element simply forwards 180 the packet to the source host. The detection of congestion may be performed for example on the basis of packet delays, delays of acknowledgment messages or by any other method known to a person skilled in the art.

In this specification, the term encrypted IP datagram refers to an IP datagram, whose data payload is encrypted at least in part.

The present invention can advantageously be used in connection with previously described fast TCP mechanism. However, the invention is not limited to such an embodiment. The invention can advantageously also be used in connection with other mechanisms, which process TCP traffic based on TCP header information, such as window size or acknowledgment messages. Therefore, the previous examples of ACK processing do not limit the invention in any way. In various embodiments of the invention, similar processing can be based on for example the window size value instead of the ACK number.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for processing IP traffic based on the information within TCP headers carried in IP datagrams, said method comprising:
   encrypting at least some of the IP-datagrams of the traffic,
   checking if the IP datagram to be encrypted contains TCP header information used as a basis for the processing at least an indication of the information in which the processing is based,
   placing said indication into the header of said datagram,
   using said indication in congestion control on a TCP/IP network, and
   delaying the transmission of an encrypted IP datagram by a network element if said encrypted IP datagram comprises an indication of a TCP acknowledgment and said network element detects congestion in the network.

2. A method according to claim 1, further comprising placing an indication of the acknowledgment is placed into the header of said datagram, if an IP datagram to be encrypted contains a TCP acknowledgment.

3. A method according to claim 1, wherein said placing of at least an indication into the header of said datagram comprises placing a copy of at least the information on which the processing is based into the header of said datagram.

4. A method according to claim 3, wherein said placing of at least an indication into the header of said datagram comprises placing of all information of a TCP header into the header of said datagram.

5. A method according to claim 3, further comprising placing a copy of a TCP acknowledgement number into the header of said datagram.

6. A method according to claim 3, further comprising placing a copy of the contents of the window size field of a TCP header into the header of said datagram.

7. A method according to claim 3, further comprising
   generating IP datagrams by a source network element,
   forwarding the IP datagrams to a destination network element by an intermediate network element,
   receiving the IP datagrams by the destination network element, and
   modifying said copy of the information on which the processing is based by said intermediate network element.

8. A method according to claim 7, further comprising
   using, by said destination network element, of said modified copy of the information instead of the encrypted version of the information carried as the payload of the IP datagram.

9. A method according to claim 1, wherein said placing comprises placing said at least an indication in an options field of said datagram, if said datagram is an Ipv4 datagram.

10. A method according to claim 1, wherein said placing comprises placing said at least an indication in an extension header in said datagram, if said datagram is an Ipv4 datagram.

11. A network element, arranged to process IP traffic based in the information within TCP headers carried in IP datagrams, said element comprising:
    encrypting means arranged to encrypt at least some of the IP-datagrams of the traffic,
    checking means arranged to check if the IP datagram to be encrypted contains TCP header information used as a basis for the processing at least an indication of the information in which the processing is based,
    placing means arranged to place said indication into the header of said datagram,
    control means arranged to be used in congestion control in a TCP IP network, and
    delaying means arranged to delay the transmission of an encrypted IP datagram by said network element if said encrypted IP datagram comprises an indication of a TCP acknowledgement and said network element detects congestion in the network.

12. A network system, for processing IP traffic based on the information within TCP headers carried in IP datagrams, comprising at least a network element according to claim 11.

* * * * *